United States Patent [19]

Molin et al.

[11] Patent Number: 4,663,043

[45] Date of Patent: May 5, 1987

[54] METHOD OF TREATING PEROXIDE-CONTAINING WASTEWATER

[75] Inventors: Nils L. Molin, Lund; Thomas G. Welander, Malmö; Bengt G. Hansson, Hörby; Per-Erik Andersson; Bengt A. G. Olsson, both of Sundsvall, all of Sweden

[73] Assignee: Purac Aktiebolag, Lund, Sweden

[21] Appl. No.: 637,818

[22] Filed: Aug. 6, 1984

[30] Foreign Application Priority Data

Aug. 10, 1983 [SE] Sweden ................ 8304356

[51] Int. Cl.[4] ............ C02F 3/28; C02F 3/30; C12P 5/02
[52] U.S. Cl. .................... 210/603; 210/605; 210/606; 210/614; 210/631; 210/632; 210/928; 435/167; 435/262
[58] Field of Search ........... 435/167, 801, 262, 264; 210/603, 605, 630, 632, 614, 928, 759, 763, 606, 631

[56] References Cited

U.S. PATENT DOCUMENTS

| | | | |
|---|---|---|---|
| 3,282,702 | 11/1966 | Schreiner | 210/763 |
| 3,994,780 | 11/1976 | Klass et al. | 210/606 |
| 4,461,708 | 7/1984 | Hakulinen et al. | 210/617 |
| 4,491,522 | 1/1985 | Ishida et al. | 210/603 |
| 4,510,243 | 4/1985 | Haga et al. | 210/603 |

OTHER PUBLICATIONS

NTIS PB 80-124274; "Catalytic Decomposition of Hydrogen Peroxide by Manganese-Alumina"; National Science Foundation (Jan. 1974).
Cocci A. A. et al.; "Anaerobic Treatment of Pulp and Paper Wastes"; Pulp & Paper Canada; vol. 83:9; pp. 70-73 (1982).

Primary Examiner—Benoît Castel
Attorney, Agent, or Firm—Burns, Doane, Swecker & Mathis

[57] ABSTRACT

It was found difficult to carry out anaerobic treatment of peroxide-containing wastewater. According to the invention, the problem is solved in that the peroxide content of the water is reduced in a catalytic pretreatment step (1), preferably an enzymatic pretreatment step.

7 Claims, 2 Drawing Figures

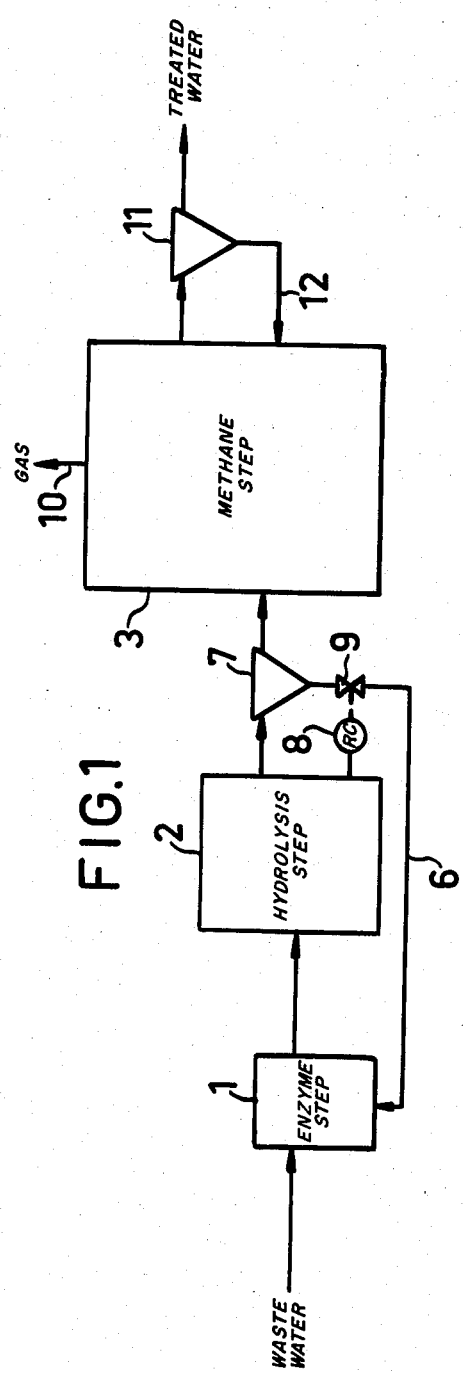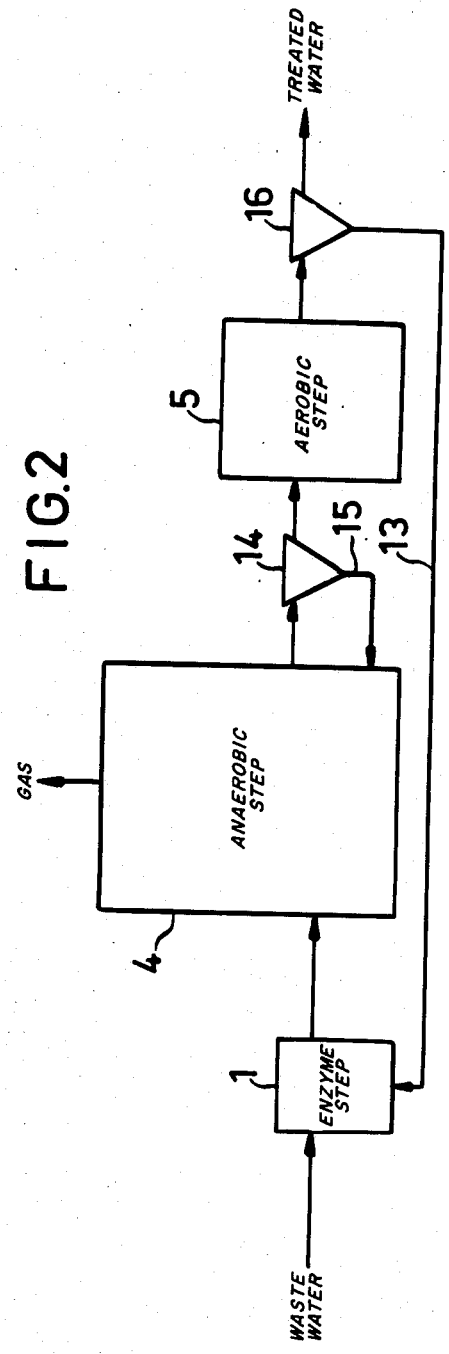

METHOD OF TREATING PEROXIDE-CONTAINING WASTEWATER

BACKGROUND OF THE INVENTION

This invention relates to a method of anaerobic treatment of wastewater, more precisely of peroxide-containing wastewater.

Anaerobic biological treatment of industrial wastewater is now being used to an ever increasing extent, but only in few cases the method has been utilized for treating wastewater from the forestry industry. One of the reasons thereof lies in the fact that wastewater of this type often contains compounds which are toxic for the bacteria.

Wastewater from the manufacture of peroxide bleached pulp often contains residual peroxide in levels toxic to methanogen bacteria. Conventional anaerobic treatment, therefore, cannot be used for such wastewater.

SUMMARY AND OBJECTS OF THE INVENTION

Briefly described, the present invention relates particularly to a method of anaerobic treatment of peroxide-containing wastewater.

The invention is characterized in that prior to the anaerobic treatment a pre-treating catalytic step is carried out, in which the peroxide content is reduced.

BRIEF DESCRIPTION OF THE DRAWINGS

FIG. 1 is a flow chart of an embodiment of the invention; and

FIG. 2 is a chart of a second embodiment.

DETAILED DESCRIPTION OF PREFERRED EMBODIMENTS

According to an especially important embodiment, the catalytic pre-treatment step is an enzymatic step. When such a method is used, the enzymes for the enzyme step preferably are generated in a subsequent hydrolysis step in a two-step anaerobic treatment process.

In order to maintain the peroxide load in the hydrolysis step substantially constant, the redox potential in the hydrolysis step can be measured continuously and be used for controlling a recycling of sludge from the sedimentation step of the hydrolysis step to the enzymatic pre-treatment step.

The enzymes for the enzymatic pre-treatment step also can be generated in an aerobic step located after the anaerobic treatment step.

The catalytic pre-treatment step also can relate to a treatment with catalytically acting heavy metals and/or heavy metal compounds. As examples of such metals iron and manganese can be mentioned.

EXAMPLE 1

In FIG. 1, an anaerobic treatment of peroxide-containing wastewater is described. The process comprises an enzymatic pretreatment step for peroxide reduction and subsequent treatment divided into two steps, a hydrolysis step and a methane step.

The peroxide content in ingoing wastewater is reduced in the enzymatic pre-treatment step to such a level, that residual peroxide easily is decomposed in the hydrolysis step. In the hydrolysis step, in addition to the final peroxide decomposition, also a conversion of organic material to lower fatty acids takes place. This conversion is carried out by fermentative, non-methanogen bacteria, which can be strict anaerobes or optional anaerobes. Due to the fact that the hydrolysis step is continuously loaded with peroxide, the microflora in this step will be controlled to optional anaerobes, with the capacity of producing peroxide decomposing enzymes, primarily catalase.

After the hydrolysis step, a sedimentation step is carried out, in which the bacteria sludge from the hydrolysis step is separated from the supernatant water, which continues to flow into the methane step. The bacteria sludge is pumped into the enzymatic pre-treatment step where the bacteria rapidly are killed in the peroxide-containing environment. The peroxide decomposing enzymes of the bacteria, however, continue to act, and the result is a substantial reduction of the peroxide content of the water passing through the enzyme step. The killed bacteria sludge then can be utilized by bacteria in the hydrolysis step for the build-up of cell pulp.

The hydrolysis step should continuously be subjected to a constant peroxide load, so that the optimum peroxide decomposing microflora is maintained. This is effected in that the redox potential in the hydrolysis step is measured, continuously and is used for controlling the pumping-back of sludge from the sedimentation step of the hydrolysis step to the enzymatic pre-treatment step. The redox potential acts as a measure of the peroxide load.

After the hydrolysis reactor, no peroxide is found in the water. In the methane step, therefore, the extremely peroxide-sensitive methanogen bacteria can convert the acids from the hydrolysis step to methane and carbon dioxide without coming into contact with peroxide. The methane step can be provided with subsequent sedimentation and sludge recycling for increasing the sludge staying time.

EXAMPLE 2

FIG. 2 describes an anaerobic treatment of peroxide-containing wastewater. The treatment comprises an enzymatic pre-treatment step for peroxide destruction, an anaerobic treatment step and a subsequent aerobic step for final treatment.

The peroxide in ingoing water is eliminated entirely in the enzymatic pre-treatment step, so that no peroxide enters the anaerobic treatment step where organic material is converted to methane and carbon dioxide. Residual organic material is decomposed in the aerobic step. After the aerobic step a sedimentation step is carried out where the aerobic sludge is separated and pumped into the enzymatic pre-treatment step. Aerobic bacteria have peroxide decomposing enzymes, primarily catalase. These enzymes decompose ingoing peroxide in the enzymatic pre-treatment step although the enzyme carrying bacteria are killed by the peroxide load. The dead bacteria can be utilized by bacteria in the anaerobic step for methane formation and cell build-up. The anaerobic step is provided advantageously with after-sedimentation and sludge recycling.

According to an important embodiment, the treatment is carried out in two anaerobic steps, viz. a hydrolysis step and a methane fermentation step, followed by an aerobic step. In such a case it is advantageous to recycle sludge to the enzymatic pre-treatment step both from the hydrolysis step and the aerobic step.

The enzymatic pre-treatment step can be carried out in an agitated tank, preferably with a staying time of 2-3 hours.

In the hydrolysis step preferably a flocculation of suspended substances in the water is effected. The flocs settle particularly well, which indicates that the suspended substances, owing to the subsequent sedimentation step, are retained in the hydrolysis step until they are degraded to such a degree as not to settle any longer.

The enzymatic pre-treatment step and the hydrolysis steps can be carried out either mesophilic (about 35° C.) or thermophilic conditions, at 50°-60° C. A thermophilic process has several advantages:

(1) It improves the peroxide decomposition (2) It improves the hydrolysis of components difficult to decompose (3) When flows outgoing from the hydrolysis step are cooled to lower temperature by heat exchange, the sedimentation properties are improved and thereby sludge is available for managing the "peroxide shock" in the enzyme step.

The hydrolysis step can be carried out in an agitated tank, with a staying time of 7-10 hours. The step is provided with continuous measurement of the redox potential, which is used as a measure of the capacity of the step to decompose ingoing peroxide. When the redox potential increases to too high a value, there is risk of reactor breakdown. The redox potential, therefore, is used for controlling the enzyme activity in the enzyme step, for example via the degree of sludge recycling.

From the hydrolysis step the water flows to the methane step where the organic acids are converted to methane by a complex microflora, which has been selected so as to have the following desirable properties:

(1) It consumes rapidly and completely the organic acids supplied to the reactor, whereby methane is formed. Also, reduced acids such as propionic and butyric acid, are converted rapidly.

(2) It is particularly resistant to hydrogen sulfide, which is formed in the methane step by sulfur producing bacteria.

(3) It forms spontaneously large flocs, which easily settle in subsequent sedimentation steps and thereby can be retained in the reactor.

The methane step can be carried out in an agitated tank, with a staying time of 3-5 days and a temperature of 35°-37° C.

The last aerobic step preferably is carried out in a biological tower.

The invention is not restricted to the embodiments described, but can be varied within the scope of the invention idea.

What is claimed is:

1. A method for an anaerobic treatment of a peroxide-containing wastewater from the production of mechanical or chemi-mechanical cellulose pulp comprising:
   (i) subjecting the wastewater to an enzymatic pre-treatment step wherein the peroxide in said wastewater is substantially destroyed;
   (ii) subjecting the wastewater of step (i) to a hydrolysis and acid fermentation step;
   (iii) subjecting the wastewater of step (ii) to a methane fermentation step; and
   (iv) subjecting the wastewater of step (iii) to an aerobic step, the enzymes for said pre-treatment step (i) being generated in the aerobic step.

2. The method according to claim 1, wherein enzymes for said enzymatic pre-treatment step are comprised of catalase.

3. The method according to claim 1 further comprising the steps of:
   continuously measuring the redox potential value of the wastewater during said hydrolysis and acid fermentation step;
   using said value for regulating transfer of sludge to said enzymatic pre-treatment step.

4. The method according to claim 1 further comprising:
   carrying out a sedimentation step after at least one of said hydrolysis and acid fermentation step and said aerobic step whereby a bacteria sludge is separated from said wastewater;
   transferring said bacteria sludge to said enzymatic pre-treatment step.

5. The method according to claim 1 wherein at least one of heavy metal and heavy metal compounds are used in said pre-treatment step.

6. The method according to claim 5 wherein said heavy metal is iron or manganese.

7. A method for anaerobic treatment of a peroxide-containing wastewater from the production of mechanical or chemi-mechanical cellulose pulp comprising:
   (i) subjecting the wastewater to an enzymatic pre-treatment step wherein the peroxide in said wastewater is substantially destroyed;
   (ii) subjecting the wastewater of step (i) to a hydrolysis and acid fermentation step, the enzymes for said pre-treatment step (i) being generated in said hydrolysis and acid fermentation step;
   (iii) subjecting the wastewater of step (ii) to a methane fermentation step; and
   (iv) subjecting the watewater of step (iii) to an aerobic step.

* * * * *